US006865190B2

(12) United States Patent
Abbas et al.

(10) Patent No.: US 6,865,190 B2
(45) Date of Patent: Mar. 8, 2005

(54) FRAMING TECHNIQUES FOR ADSL SYSTEMS

(75) Inventors: Syed Abbas, Fremont, CA (US); Guozhu Long, Newark, CA (US)

(73) Assignee: Centillium Communications, Inc., Fremont, CA (US)

( * ) Notice: Subject to any disclaimer, the term of this patent is extended or adjusted under 35 U.S.C. 154(b) by 841 days.

(21) Appl. No.: 09/846,883

(22) Filed: May 1, 2001

(65) Prior Publication Data

US 2002/0015421 A1 Feb. 7, 2002

Related U.S. Application Data

(60) Provisional application No. 60/237,091, filed on Sep. 29, 2000, provisional application No. 60/222,103, filed on Jul. 28, 2000, and provisional application No. 60/201,689, filed on May 1, 2000.

(51) Int. Cl.[7] .............................. H04J 3/00; G06F 11/00
(52) U.S. Cl. ...................... 370/471; 370/476; 370/506; 714/776
(58) Field of Search ............................ 370/389, 395.1, 370/395.6, 465, 469, 470, 471, 474, 476, 503, 506, 525; 375/355, 362, 363, 370; 379/93.01, 93.06, 93.07; 714/746, 752, 776, 781, 784, 798

(56) References Cited

U.S. PATENT DOCUMENTS

| | | | | |
|---|---|---|---|---|
| 5,737,337 A | * | 4/1998 | Voith et al. | 714/702 |
| 5,751,741 A | * | 5/1998 | Voith et al. | 714/758 |
| 5,825,768 A | * | 10/1998 | Kimbrow et al. | 370/341 |
| 5,883,907 A | * | 3/1999 | Hoekstra | 714/784 |
| 6,202,178 B1 | * | 3/2001 | Spruyt | 714/702 |
| 6,449,288 B1 | * | 9/2002 | Chari et al. | 370/470 |
| 6,801,570 B2 | * | 10/2004 | Yong | 375/219 |

OTHER PUBLICATIONS

ITU Telecommunication Standardization Sector Recommendation G.992.2, "Splitterless Asymmetric Digital Subscriber Line (ADSL) Transceivers," 185 pp., Mar. 1999.

ITU Telecommunication Standardization Sector Recommendation G.992.1, "Asymmetrical Digital Subscriber Line (ADSL) Transceivers," 264 pp., Jul. 1999.

* cited by examiner

*Primary Examiner*—Alpus H. Hsu
(74) *Attorney, Agent, or Firm*—Fenwick & West LLP (57) ABSTRACT

Framing techniques for ADSL systems that allow programmable fixed overhead efficient framing and seamless rate changes.

24 Claims, 8 Drawing Sheets

FRAMING TECHNIQUES FOR ADSL SYSTEMS

RELATED APPLICATIONS

This application claims the benefit of U.S. Provisional Application No. 60/201,689, filed May 1, 2000, U.S. Provisional Application No. 60/222,103, filed Jul. 28, 2000, and U.S. Provisional Application No. 60/237,091, filed Sep. 29, 2000, all of which are hereby incorporated by reference in their entirety.

FIELD OF INVENTION

This invention relates to communication systems, and more specifically, to framing techniques for DMT ADSL systems.

BACKGROUND OF THE INVENTION

The Telecommunications Standards Section of the International Telecommunication Union (ITU-T) develops recommendations to facilitate the interoperation of telecommunication networks. Two of these recommendations are designated as G.992.1 (sometimes referred to as G.dmt) and G.992.2 (sometimes referred to as G.lite). Recommendation G.992.1 refers to an asymmetric digital subscriber line (ADSL) transceiver that is an ADSL industry standard for typical network access at data rates up to 8.192 Mbit/s downstream and 640 kbit/s upstream. Recommendation G.992.2, on the other hand, refers to an ADSL transceiver that is a lower data rate version of a G.992.1 ADSL transceiver. Data rates up to 1.5 Mbit/s in the downstream direction and 512 kbit/s upstream are typical with this standard. Factors such as the electrical characteristics of the customer's equipment, the distance between the subscriber and central office, and the error rate allowed all contribute to the data rate of G992.1 and G992.2 transceivers.

G.992.1 and G.992.2 transceivers both employ discrete multi-tone (DMT) technology. DMT is a form of multicarrier modulation in which the spectrum of the input signal is spread over numerous bands, also referred to as sub-channels. Each sub-channel is modulated to some carrier frequency. By working with a large number of carriers rather than a single carrier, the available channel capacity is maximized thereby optimizing performance of the transmission. A DMT symbol is the basic unit of information transmitted by an ADSL transceiver. The number of bits encoded into each sub-channel in a DMT symbol is limited by the quality of the communication channel. The quality of the communication channel can be represented by its signal-to-noise ratio (SNR). Once a connection between the central office side and the customer side has been established, the transceivers continue to monitor the changing SNR on the line and swap bits from one sub-channel to another to maintain system performance. One of the major differences between the standards is that G.992.1 downstream communication uses up to 255 sub-channels, while G.992.2 downstream communication uses up to 127 sub-channels. Thus, standard G.992.2 has a smaller available downstream bandwidth than standard G.922.1.

Both G.992.1 and G.992.2 further describe a DMT ADSL system framing standard that is designed to provide a fixed overhead per DMT symbol. A number of issues are associated with this framing approach. For example, DMT ADSL systems generally operate at different data rates depending on the associated copper loop. As such, the frame efficiency varies from one loop to the next. Generally, the frame efficiency can be determined by:

$$((\text{line rate(kbps)} - \text{overhead(kbps)})/\text{line rate(kbps)}) * 100\%$$

where overhead is the Reed-Solomon (RS) codeword overhead and the sync byte. In general, the minimum fixed overhead takes up substantial bandwidth. This can be a particular problem for loops having a low total bit capacity (e.g., long loops and/or a large amount of crosstalk).

In addition, a change in the channel noise profile may require a data rate reduction to maintain the desired service margin. Likewise, spare capacity in one latency path could be beneficially used by another latency path thereby improving the overall data carrying capacity of the latency paths. In current standards, however, there is no seamless way to change the data rate (while keeping the overhead capacity the same) once a link is established between a transceiver pair without interrupting the connection, or losing a significant amount of data.

Existing techniques fail to provide a complete solution to these problems. For example, one approach allows the framing efficiency to increase for low data rate loops. However, this approach does not allow for seamless rate changes. In another approach, seamless rate changes are possible. However, if the frame efficiency is increased for the long loops, the framing efficiency on the short loops is decreased. Moreover, the overhead capacity becomes a function of the connected line rate and thus does not remain fixed and predictable.

What is needed, therefore, is a framing technique that allows for seamless rate adaptation, fixed-overhead capacity for all line rates, and high efficiency on loops that allow only low line rates.

BRIEF SUMMARY OF THE INVENTION

One embodiment of the present invention provides method for assigning bytes to mux data frames in an ADSL system. Generally, mux data frames are effectively byte decoupled from the RS codeword, and mux data frame rate is coupled to the DMT symbol rate. The method includes calculating an average number of TC-sublayer bytes per mux data frame. In response to the calculated average number of TC-sublayer bytes per mux data frame being a non-integer, the method may further include rounding the calculated average number of TC-sublayer bytes per mux data frame up to a next integer value thereby producing an integer version of the average number of TC-sublayer bytes per mux data frame. The method may further include calculating an adjusted number of mux data frames. In response to the adjusted number of mux data frames being a non-integer, the method may further include truncating the adjusted number of mux data frames thereby producing an integer version of the adjusted number of mux data frames. In general, given the desired framing parameters, the number of payload data bytes and sync bytes (if any) per mux data frame is determined.

Another embodiment of the present invention provides an DSL transmitter configured to carry out framing techniques described herein. Combinations of framing parameters including a symbol rate multiplying factor and the number of sync bytes per mux data frame can be used to program desired overhead channel capacities.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
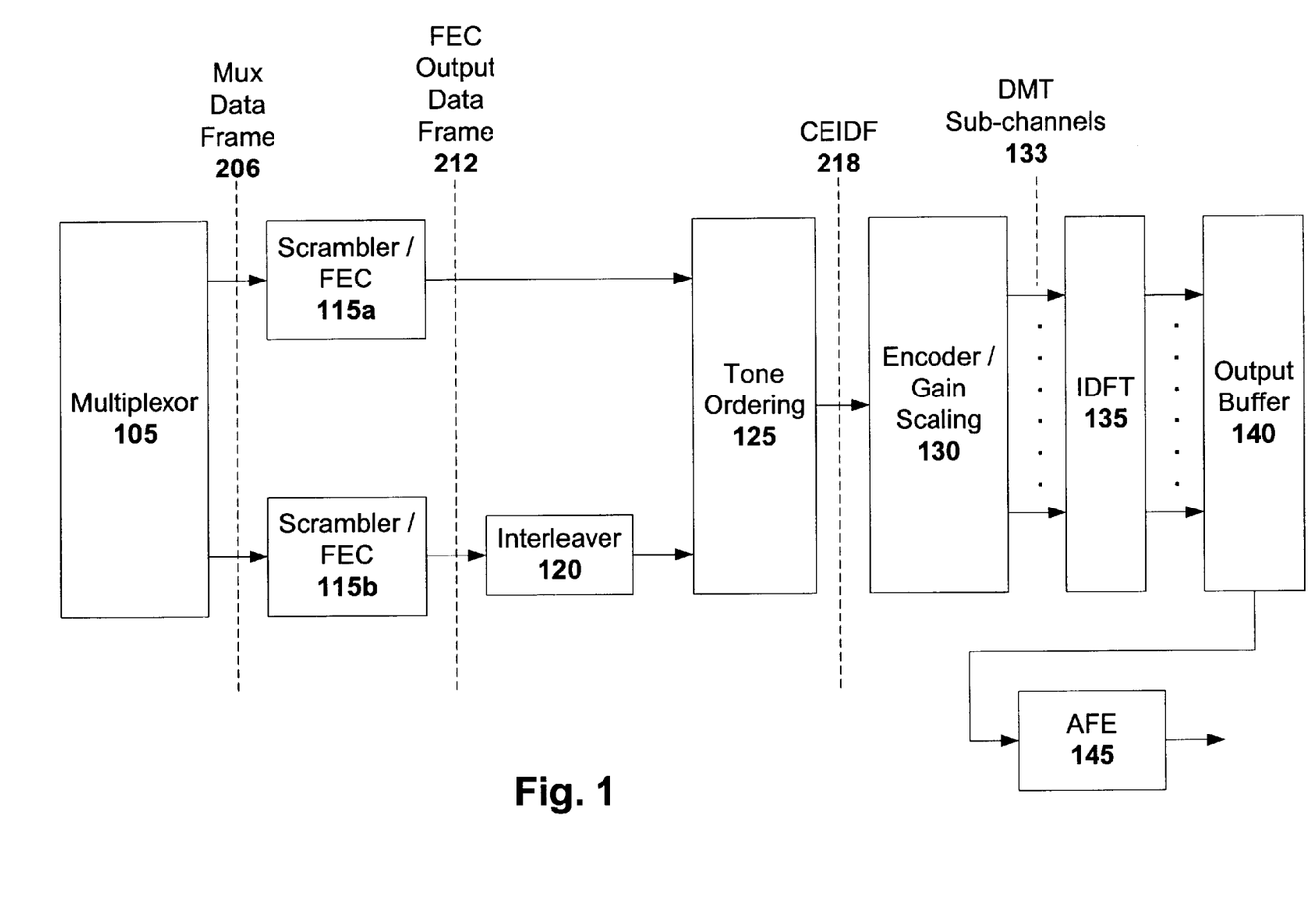
FIG. 1 is a block diagram of an ADSL transmitter in accordance with one embodiment of the present invention.

FIG. 1 is a block diagram of an ADSL transmitter in accordance with one embodiment of the present invention. The transmitter includes a multiplexor module 105, scrambler and forward error correction (FEC) modules 115a and 115b, an interleaver module 120, a tone ordering module 125, an encoder and gain scaling module 130, an inverse discrete Fourier transform (IDFT) module 135, a output buffer 140, and an analog front end 145. Generally, the transmitter illustrated is based on a model for facilitating understanding of transmitter function in accordance with ITU Recommendations G.992.1 and G.992.2 (collectively referred to as ADSL standards). Each of these Recommendations is herein incorporated by reference in its entirety.

General Overview

The transmitter shown in FIG. 1 may be deployed in either the upstream or downstream direction. The multiplexor module 105 multiplexes requisite overhead (e.g., CRC bits, indicator bits, eoc and aoc messages are carried over what is commonly referred to as a sync byte) with the user payload data from a system interface (e.g., ATM or STM). Typically, there are two latency paths in the transmitter (e.g., a fast path and an interleaved path). Note, however, that alternative embodiments may include more than two latency paths. Additional paths may optionally include either or both an FEC module and an interleaver module. In general, a fast latency path (e.g., including scrambler/FEC module 115a) may be configured to provide lower latency than an interleaved path. An interleaved path (e.g., including scrambler/FEC module 115b and interleaver module 120), on the other hand, provides protection against burst errors due to the transmitted signal clipping or impulse noise at the cost of greater latency.

In the embodiment shown, the mux data frames provided by multiplexor 105 to each latency path are subjected to scrambling (e.g., 115a and b) and forward error correction coding (e.g., 115a and b). In addition, the mux data frames provided by multiplexor 105 to the interleaved latency path are subjected to an interleaver function (e.g., 120). The two data streams may then be combined into a data symbol that is input to the constellation encoder (e.g., 130). Before a data symbol is mapped to the sub-carrier constellations, the sub-carriers may be appropriately tone ordered (e.g., 125). After constellation encoding, the data is modulated (e.g., 135), buffered (e.g., 140), and converted (e.g., 145) to its analog equivalent to facilitate transmission across the transmission loop.

Because of the addition of FEC redundancy bytes and data interleaving, the various intermediate data frames (bit-level data prior to constellation encoding) have different structure at three reference points of the transmitter. These reference points are shown in FIG. 1 and include 206 (mux data frame), 212 (FEC output data frame), and 218 (constellation encoder input data frame). Generally, the present invention provides a framing technique and framing parameters that result in a certain order of sync, payload data and the RS codeword redundancy bytes to achieve programmable fixed overhead efficient framing that allows seamless rate changes. The frame format will be explained in more detail during discussion in reference to FIGS. 2a–f and 3.

Variations on the transmitter configuration illustrated in FIG. 1 will be apparent in light of this disclosure, and the present invention is not intended to be limited to any one configuration. For example, other embodiments of the transmitter may include modules not shown in the figure (e.g., an amplifier, line driver, anti-aliasing filter, hybrid circuitry and splitter). Likewise, other embodiments of the transmitter may not include some of the modules shown (e.g., FEC module or interleaving module) on one of the latency paths. The transmitter components may be implemented in hardware, software, firmware or any combination thereof. For example, each of the components shown in FIG. 1 may be implemented as one or more application specific integrated circuits. Likewise, the components may be implemented as a set (or sets) of instructions running on one or more digital signal processors. Numerous embodiments and configurations will be apparent in light of this disclosure.

Components

The multiplexor module 105 multiplexes the user payload data bytes and overhead bytes (e.g., sync bytes). The multiplexor module 105 may include, for example, a multiplexor for each latency path and separate buffers (e.g., a fast buffer and an interleaved buffer) to store the multiplexed data for each corresponding latency path. In the embodiment shown, the multiplexor on each of the latency paths (whether downstream or upstream) has a mux data frame rate that is either synchronized to a 4 kHz ADSL DMT symbol rate or to its known fraction or a multiple through a multiplying factor.

In the embodiment shown, a cyclic redundancy check (CRC) is performed on the multiplexed data for each latency path. Generally, the CRC bits of a particular latency path are carried in a sync byte included in each mux data frame assigned to that latency path after every 68 DMT symbols. Remaining sync bytes that are transmitted over 68 DMT symbols (e.g., an ADSL superframe) carry other overhead related information (e.g., indicator bits, eoc and aoc messages). The multiplexor module 105 outputs mux data frames 206. The operation of the multiplexor module 105 is further discussed with reference to FIGS. 2a–f and 3.

For the sake of clarity, note that current ADSL standards define a superframe structure. Each superframe is composed of a number of data frames (e.g., 68 data frames numbered 0 through 67). These data frames are encoded and modulated into DMT symbols. Each DMT symbol is followed by a synchronization symbol. In general, such synchronization symbols carry no user or overhead bit-level data and are inserted by the modulator (e.g., 135) to establish superframe boundaries. From the bit-level and user data perspective, the DMT symbol rate is 4000 baud resulting in a period equal to 0.25 milliseconds (in accordance with ADSL standards). However, in order to allow for the insertion of the synchronization symbol, the actual transmitted DMT symbol rate is 69/68×4000 baud.

In the scrambler and FEC modules 115a and 115b, the scrambler (e.g. when present and operational) operates on the output data buffer of each mux data frame 206 in order to randomize the data pattern as is conventionally done. Such randomizing is for optimizing the transmission performance. Scrambling also minimizes the possibility of repetitive data patterns. Generally, FEC is based on Reed-Solomon (RS) coding. The size (in bytes) of a resulting RS codeword is $N_{FEC}=K+R$, where the number of check bytes R and codeword size $N_{FEC}$ vary depending on the number of bits assigned to each latency path and the latency requirements associated with each path. The scrambler and FEC modules 115 output the RS codewords, which form the FEC output data frames 212.

The interleaver module 120 performs a conventional interleaving function on the FEC output data frames 212. In one embodiment, the FEC output data frames 212 are convolutionally interleaved in accordance with ADSL standards to a specified interleave depth. Generally, the interleaving process delays each byte of a given FEC output data frame 212 by a different amount. This results in the constellation encoder input data frames 218 containing bytes from a number of different FEC output data frames 212. Given a convolutional interleaving algorithm and the interleaving depths (e.g., powers of 2), the output bytes from the interleaver always occupy distinct time slots when the RS codeword size (N) is odd. When N is an even number of bytes, a dummy byte can be added at the beginning of the RS codeword at the input to the interleaver. The resultant odd-length RS codeword is then convolutionally interleaved. The dummy byte is then removed from the output of the interleaver.

The tone ordering module 125 effects a tone ordering algorithm (e.g., vendor specified) to reduce the errors related to clipping caused by the digital-to-analog converter (not shown) of the transmitter. In general, the numbers of bits and the relative gains to be used for every tone are predetermined by the receiver (e.g., by conventional bitloading assignment techniques) and provided to the transmitter. These bit-gain pairs are typically stored in ascending order of frequency (e.g., as designated by tone number) in a bit and gain table. "Tone-ordered" encoding can then be performed, where bits from a fast path are assigned to the tones with the smallest bit assignment, and bits from an interleaved path are assigned to the remaining tones. As is known in the art and illustrated in ADSL standards, tone ordering and bit extraction may be performed with and without trellis coding. Note that because the data from the fast path is not interleaved, the constellation encoder input data frame 218 is identical to the corresponding FEC output data frame 212 (if fast path is the only latency path used).

The encoder and gain scaling module 130, which can be implemented with or without trellis coding, receives the constellation encoder input data frames 218 and encodes them as signal points in signal constellations based on a given tone ordering. The encoder and gain scaling module 130 may further include a convolutional encoder module for obtaining the coding gain. In one embodiment, for each sub-channel, QAM modulation is used where each constellation signal point has an in-phase component and a quadrature component. Depending on the constellation size of each DMT sub-channel, each sub-carrier carries multiple bits. For example, 64-QAM has 64 points in the constellation. This means that a sub-channel can carry six binary bits. A larger constellation size carries more bits per symbol. Sub-channels can have different constellation sizes. The total number of bits transmitted is the sum of the number of bits transmitted by each sub-channel. A number of sub-channels 133 (e.g., 255 for downstream, 31 for upstream with appropriate gain scaling) are provided by the encoder and gain scaling module 130 to the IDFT module 135.

The inverse discrete Fourier transform (IDFT) module 135 modulates the constellations (e.g., QAM constellations) output by the encoder and gain scaling module 130 on to the available transmission DMT sub-channels and combines all the sub-channels together for transmission. The output buffer 140 stores the modulated samples for transmission. The analog front end (AFE) 145 converts the samples to analog signals, which are then filtered, amplified and coupled to the transmission line. Note that the IDFT module 135, the output buffer 140 and the analog front end 145 may be implemented in conventional technology.

Generally, the functionality of the transmitter is demonstrated by way of FIG. 1. Examples, as described in reference to FIGS. 2a, 2b, 2c, 2d, 2e, 2f and 3, provide necessary implementation details. Note that the transmission rate of the transmitter is a function of the total number of bits per symbol and the symbol rate. For example, using 96 sub-channels with each sub-channel carrying 8 bits per symbol, at a 4 K-baud symbol rate, a transmission rate of 4×96×8= 3072 kbit/second is achieved.

Figure 2A:
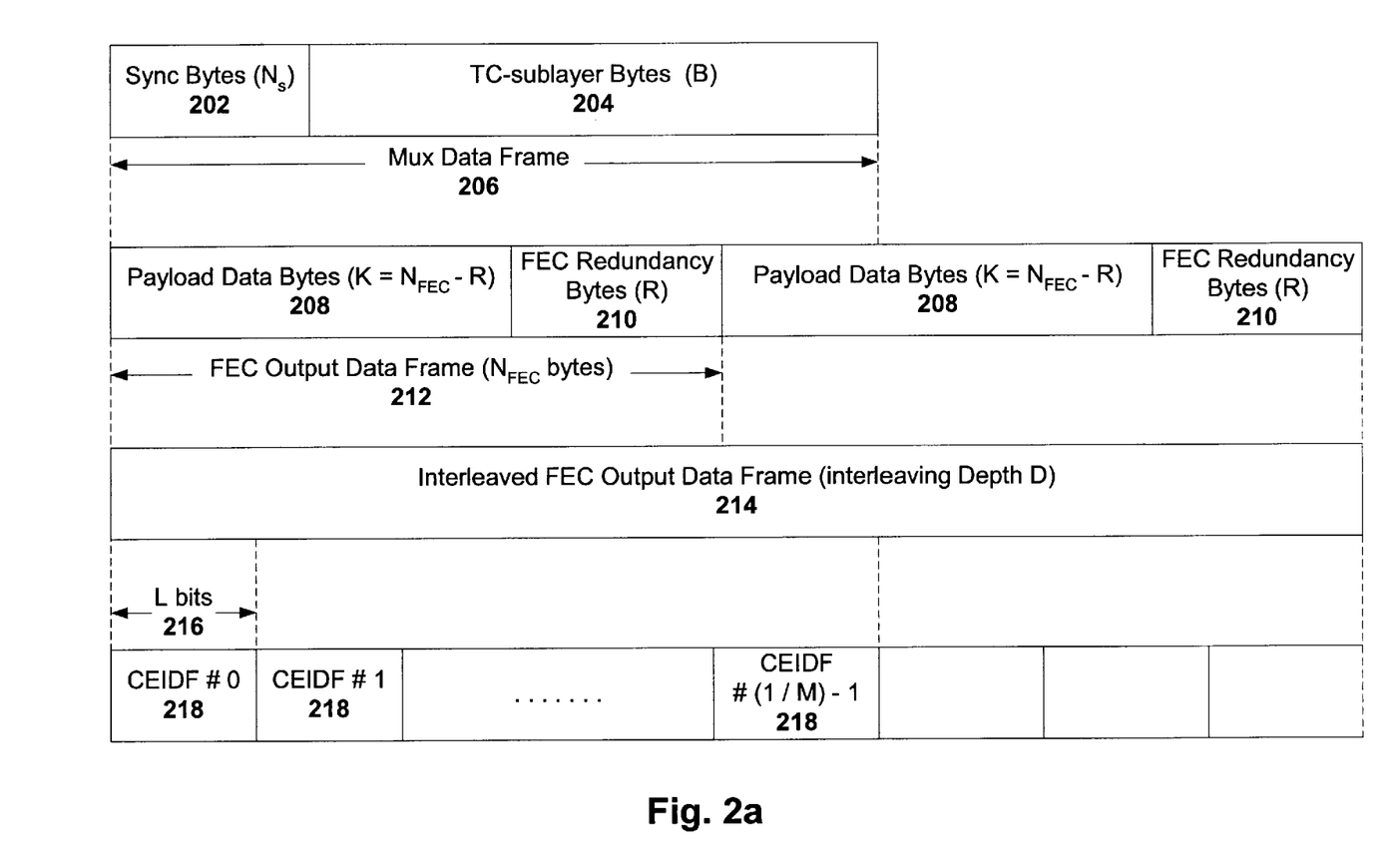
FIG. 2a is a diagram illustrating a programmable fixed overhead frame format in accordance with one embodiment of the present invention.

FIG. 2a is a diagram illustrating a programmable fixed overhead frame format in accordance with one embodiment of the present invention. The frame format shown can be configured through the parameters $B_{AV}$, M, $N_S$, R, D, and $N_{FEC}$ at initialization. These parameters may, for example, be configured through the given management information database for a fixed rate service. Alternatively, these parameters may be determined for best performance in the case of the best effort service given the latency requirements, and required bit error ratio and overhead capacity (once L is known). They are defined as follows:

B The typical number of TC-sublayer bytes per mux data frame (TC-sublayer is an abbreviation for Transmission Convergence sublayer);

$B_{AV}$ The average number of TC-sublayer bytes per mux data frame;

M A multiplying factor to the DMT symbol rate (4 k symbols/sec) that determines the mux data frame rate and overhead (e.g., sync byte) capacity;

$N_S$ The number of sync bytes per mux data frame;

R The number of FEC redundancy bytes per RS codeword (sometimes referred to as check bytes);

D RS codeword interleaving depth;

$N_{FEC}$ The number of bytes per RS codeword; and

L The number of bits per constellation encoder input data frame (CEIDF).

For purposes of clarity, the following derived parameters and their corresponding definitions are also provided:

K The number of payload data bytes per RS codeword;

S The number of DMT symbols per RS codeword based on L;

$TB_{8NFEC}$ Number of bytes per $(8*N_{FEC})$ DMT symbols;

$FEC\_CW_{8NFEC}$ Number of FEC codewords per $(8*N_{FEC})$ DMT symbols;

$K_{8NFEC}$ Number of FEC payload data bytes carried over $(8*N_{FEC})$ DMT symbols;

$SB_{8NFEC}$ Number of sync bytes carried over $(8*N_{FEC})$ DMT symbols;

$B_{8NFEC}$ Number of payload data bytes carried over $(8*N_{FEC})$ DMT symbols; and $MDF_{8NFEC}$ Number of mux data frames carried during $(8*N_{FEC})$ DMT symbols.

Given the above definitions, the following relations hold true:

$S = 8*N_{FEC}/L$ (a rational number); and $K = N_{FEC} - R$ (in bytes).

In the embodiment shown, each mux data frame 206 (e.g., as produced at the output of the multiplexor module 105) includes a number of sync bytes 202 ($N_S$) and a number of TC-sublayer bytes 204 (B). The resulting mux data frames are effectively byte decoupled from the RS codewords. The rate of mux data frames, however, is coupled to the DMT symbol rate through the multiplying factor M. As such, a fixed sync byte overhead that is programmable to different values is guaranteed. The resulting FEC output data frame 212 includes a number of sync bytes 202, a number of payload data bytes 208 (K) and a number of FEC redundancy bytes 210 (R). The given interleaving depth is specified by D. Each of the resulting constellation encoder input data frames (CEIDF) 218 are mapped to a DMT symbol L bits 216 at a time.

In one embodiment, the following values for $N_S$ and M are used to support a programmable overhead channel capacity ranging from 4 to 64 kbps (kilobits per second) at a granularity of 4 kbps: $N_S$=1 and 2; and M=⅛, ⅜, ⅝, ⅞, ¼, 9/16, ½, 11/16, 13/16, 15/16, and 1. Table 1 shows the combinations of the $N_S$ and M parameters that program the corresponding overhead channel capacities.

Aligning the Mux Data Frame to DMT Symbols

The start boundaries of the constellation encoder input data frame (sometimes referred to as symbol boundaries) and the RS codeword are aligned at least at the beginning of SHOWTIME and further every ($8*N_{FEC}$) symbols. More specifically, the alignment occurs at least every $8*255=2040$ data symbols (assuming 255 is the highest value of $N_{FEC}$ used) or every 0.51 seconds or less depending on the value of $N_{FEC}$ used. The mux data frame is designed to ensure that the number of bytes in $8*N_{FEC}*M$ mux data frames is equal to $L*K$ bytes over $8*N_{FEC}$ symbols. The mux data frame has $N_S*(M*8*N_{FEC})$ sync bytes per $8*N_{FEC}$ DMT symbols to ensure a constant overhead capacity for the link. In one embodiment, the overhead equals $N_S*M*32$ kbps. This requires that there are exactly $M*8*N_{FEC}$ mux data frames per $8*N_{FEC}$ DMT symbols. The size (in bytes) of all the mux data frames in $8*N_{FEC}$ DMT symbols is not necessarily the same. A payload data byte assignment algorithm may be employed to determine the mux data frame size pattern over $8*N_{FEC}$ DMT symbols. This pattern repeats every $8*N_{FEC}$ DMT symbols. An embodiment of one such byte assignment procedure is illustrated and described in reference to FIGS. 2b, 2c, 2d, 2e, 2f, and 3.

Figure 2B:
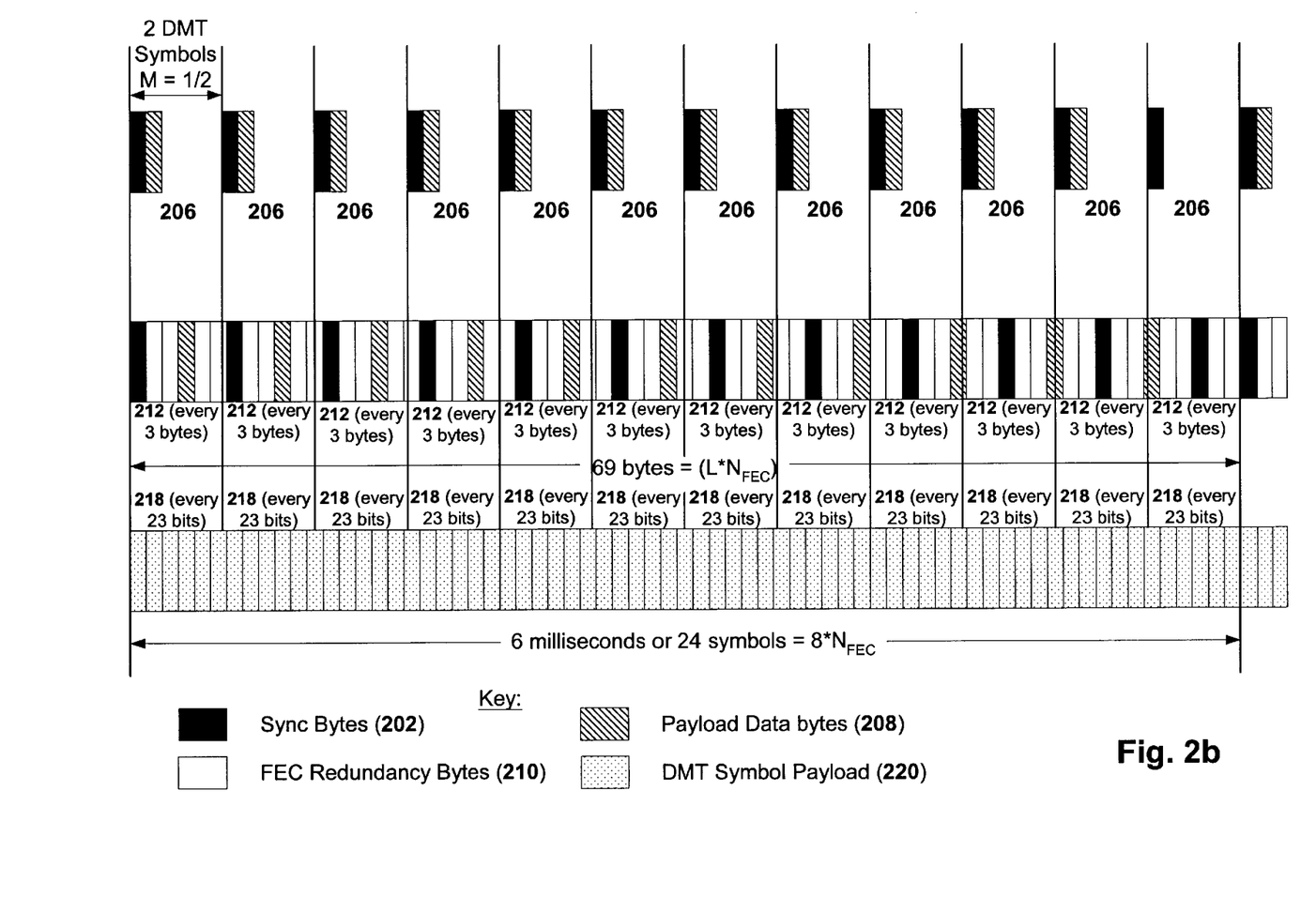
FIGS. 2b through 2f demonstrate examples of programmable overhead framing in accordance with one embodiment of the present invention.

FIG. 2b demonstrates a framing in accordance with one embodiment of the present invention. In this particular embodiment, the following parameters are given: $N_{FEC}$=3, R=2, K=1, $N_S$=1, M=½, L=23, $B_{AV}$=0.9166, and D=1. These

TABLE 1

|  | M = ⅛ | M = ⅖ | M = ⅜ | M = ⅘ | M = ⅝ | M = 6/8 | M = ⅞ | M = 1 | M = 9/16 | M = 11/16 | M = 13/16 | M = 15/16 |
|---|---|---|---|---|---|---|---|---|---|---|---|---|
| $N_S$ = 1 | 4 kbps | 8 kbps | 12 kbps | 16 kbps | 20 kbps | 24 kbps | 28 kbps | 32 kbps | | | | |
| $N_S$ = 2 | | | | | 40 kbps | 48 kbps | 56 kbps | 64 kbps | 36 kbps | 44 kbps | 52 kbps | 60 kbps |

Note that $N_S$ and M can be set to other values so as to configure any overhead channel capacity desired. Overhead channel capacities less than 4 kbps can also be configured as follows:

|  | $N_s$ = ½ | $N_s$ = ¼ | $N_s$ = ⅛ | $N_s$ = 1/16 | $N_s$ = 1/32 | $N_s$ = 1/64 |
|---|---|---|---|---|---|---|
| M = 1 | | | | 2 kbps | 1 kbps | 0.5 kbps |
| M = ½ | | | 2 kbps | 1 kbps | 0.5 kbps | 0.25 kbps |
| M = ¼ | | 2 kbps | 1 kbps | 0.5 kbps | 0.25 kbps | 0.125 kbps |
| M = ⅛ | 2 kbps | 1 kbps | 0.5 kbps | 0.25 kbps | 0.125 kbps | 0.0625 kbps |

Note that a fractional $N_S$ value indicates that a sync byte corresponds to more than one mux data frame. For example, an $N_S$ of ½ indicates that there is one sync byte per every two mux data frames. Note that sync byte is assigned to one of the corresponding mux data frames and is not split for the ease of implementation. In general, overhead channel capacity can be determined by $N_S*M*32$ kbps. Thus, numerous alternative embodiments will be apparent in light of this disclosure. Further note that the number of combinations of $N_S$ and M parameter values depends of factors such as the desired implementation complexity and the required range and granularity of the overhead channel capacity. Generally, given a desired set of overhead capacity values, M and $N_S$ can be selected for ease of implementation.

parameters are chosen for the purposes of facilitating illustration of example frames (e.g., so as to reduce the number of bytes required to illustrate example frames). Based on these parameters, the line rate is $L*4000$ symbols/sec= $23*4000$ symbols/sec=92 kbps; the net payload data rate is $B_{AV}*M*32$ kbps=$0.9166*(½)*32$ kbps=14.66 kbps; the sync byte overhead is $N_S*M*32$ kbps=$1*(½)*32$ kbps=16 kbps; and the RS codeword overhead is line rate−(sync byte overhead+net payload data rate)=92−(16+14.66)=61.33 kbps. Note that the sum of net payload data rate, RS codeword overhead and sync byte overhead must be equal to line rate.

As can be seen, there are two DMT symbols per each mux data frame 206, and M is equal to ½. There is one sync byte 202 per two DMT symbols since $N_S$=1 and M=½. Note that there are eleven consecutive mux data frames 206, each having one sync byte 202 and one payload data byte 208. However, the twelfth mux data frame 206 only has a sync byte 202. This pattern then repeats for each set of consecutive twelve mux data frames 206. In more detail, the number of payload data bytes carried over ($8*N_{FEC}$) DMT symbols can be calculated by $(L*K)−(N_S*M*8*N_{FEC})$. Given the specified parameters for this example, $B_{8NFEC}$ equals 11. In addition, the number of mux data frames carried over ($8*N_{FEC}$) DMT symbols can be calculated by $M*8*N_{FEC}$, which equals 12 for this example. Thus, 11 payload data bytes are carried by 12 mux data frames. As illustrated in FIG. 2b, 11 mux data frames 206 have 1 payload data byte 208 each for a total of 11 payload data bytes 208. The twelfth mux data frame 206 has no payload data bytes 208. The discussion in reference to FIG. 3 will provide further understanding of this frame example.

Note from FIG. 2b that there is no necessary simultaneous alignment of the start of a mux data frame, a RS codeword and a DMT symbol except at the beginning of SHOWTIME (e.g., data mode) and then every $8*N_{FEC}$ symbols. There is also no necessary simultaneous byte alignment of the mux data frame, RS codeword and a DMT symbol except at the beginning of SHOWTIME and then every $8*N_{FEC}$ symbols. There is a byte alignment of the FEC output data at the beginning of SHOWTIME and then at least at the end of every $8^{th}$ DMT symbol.

Figure 2C:
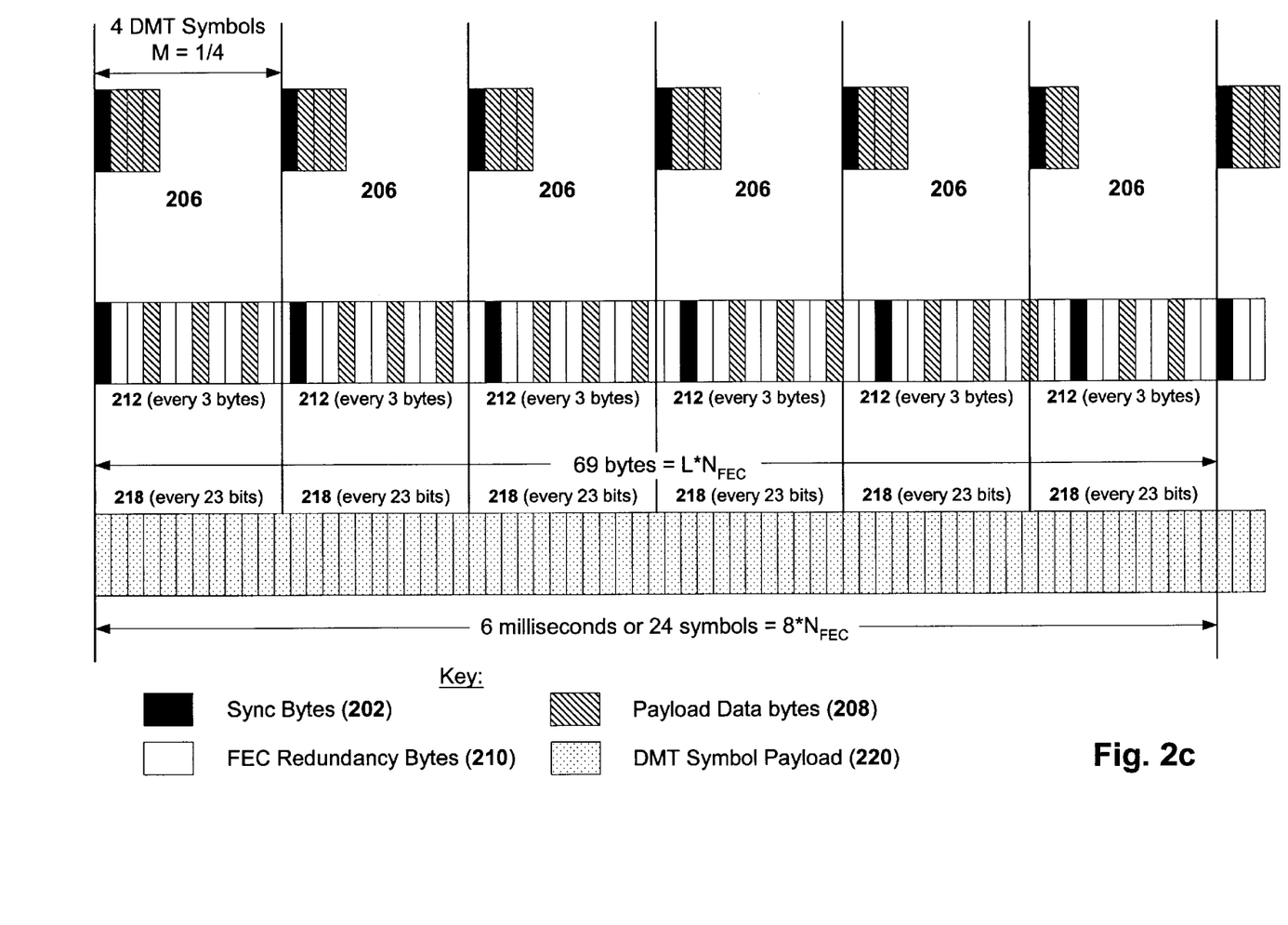

FIG. 2c demonstrates a framing in accordance with one embodiment of the present invention. In this particular embodiment, the following parameters are given: $N_{FEC}=3$, R=2, K=1, $N_S=1$, M=¼, L=23, $B_{AV}=2.833$, and D=1. In addition, the line rate is 92 kbps, the net data rate is 22.66 kbps, the RS codeword overhead is 61.33 kbps, and the sync byte overhead is 8 kbps. Contrasting this case with the case of FIG. 2b, note that only parameter M was changed. Thus as a result, the sync byte overhead changed to 8 kbps. Since RS codeword parameters are the same, the RS codeword overhead did not change. Since the total transmission rate is the same, the amount of reduction in the sync byte overhead is added to the net payload data rate.

As can be seen, there are four DMT symbols per each mux data frame 206, and M is equal to ¼. There is one sync byte 202 per four DMT symbols since $N_S=1$ and M=¼. Note that there are five consecutive mux data frames 206, each having one sync byte 202 and three payload data bytes 208. However, the sixth mux data frame 206 only has a sync byte 202 and two payload data bytes 208. This pattern then repeats for each set of consecutive six mux data frames 206. In more detail, the number of payload data bytes carried over $(8*N_{FEC})$ DMT symbols can be calculated by $(L*K)-(N_S*M*8*N_{FEC})$. Given the specified parameters for this example, $B_{8NFEC}$ equals 17. In addition, the number of mux data frames carried over $(8*N_{FEC})$ DMT symbols can be calculated by $M*8*N_{FEC}$, which equals 6 for this example. Thus, 17 payload data bytes are carried by 6 mux data frames. As illustrated in FIG. 2c, five mux data frames 206 have 3 payload data bytes 208 each for a total of fifteen payload data bytes 208. The sixth mux data frame 206 only has a sync byte and two payload data bytes 208 bringing the total of payload bytes to 17. The discussion in reference to FIG. 3 will provide further understanding of this frame example.

Figure 2D:
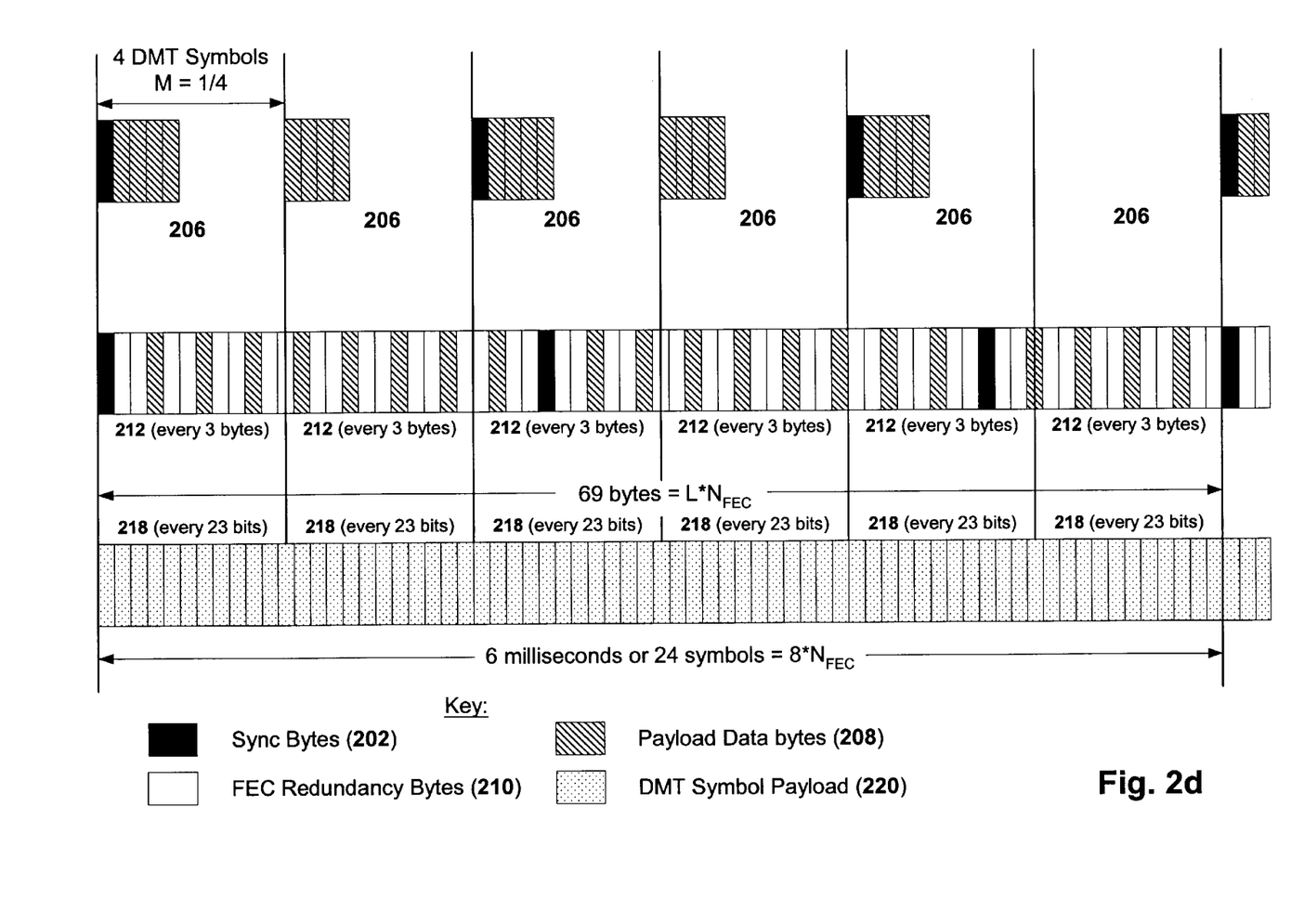

FIG. 2d demonstrates a framing in accordance with one embodiment of the present invention. In this particular embodiment, the following parameters are given: $N_{FEC}=3$, R=2, K=1, $N_S=½$, M=¼, L=23, $B_{AV}=3.33$, and D=1. In addition, the line rate is 88 kbps, the net data rate is 22.66 kbps, the RS codeword overhead is 61.33 kbps, and the sync byte overhead is 4 kbps. Note here that $N_S$ is fractional. More specifically, there is one sync byte per every two mux data frames. Generally, the mux data frame that is assigned the sync byte can be determined by the mux data frame payload data byte assignment.

As can be seen, there are four DMT symbols per each mux data frame 206, and M is equal to ¼. In addition, $N_S$ is equal to ½. There is one sync byte 202 per eight DMT symbols since $N_S=½$ and M=¼. Note that there are five consecutive mux data frames 206, each having four payload data bytes 208. Also, every other mux data frame 206 includes a one sync byte 202. The sixth mux data frame 206 no sync bytes and no payload data bytes. Note that if the sync byte was assigned to the second mux data frame 206 (for each pair of mux data frames assigned a sync byte) instead of the first, the sixth mux data frame 206 would include a sync byte 202. The pattern repeats for each set of consecutive six mux data frames 206. In more detail, the number of payload data bytes carried over $(8*N_{FEC})$ DMT symbols can be calculated by $(L*K)-(N_S*M*8*N_{FEC})$. Given the specified parameters for this example, $B_{8NFEC}$ equals 20. In addition, the number of mux data frames carried over $(8*N_{FEC})$ DMT symbols can be calculated by $M*8*N_{FEC}$, which equals 6 for this example. Thus, 20 payload data bytes are carried by 6 mux data frames (as illustrated in FIG. 2d). The discussion in reference to FIG. 3 will provide further understanding of this frame example.

Figure 2E:
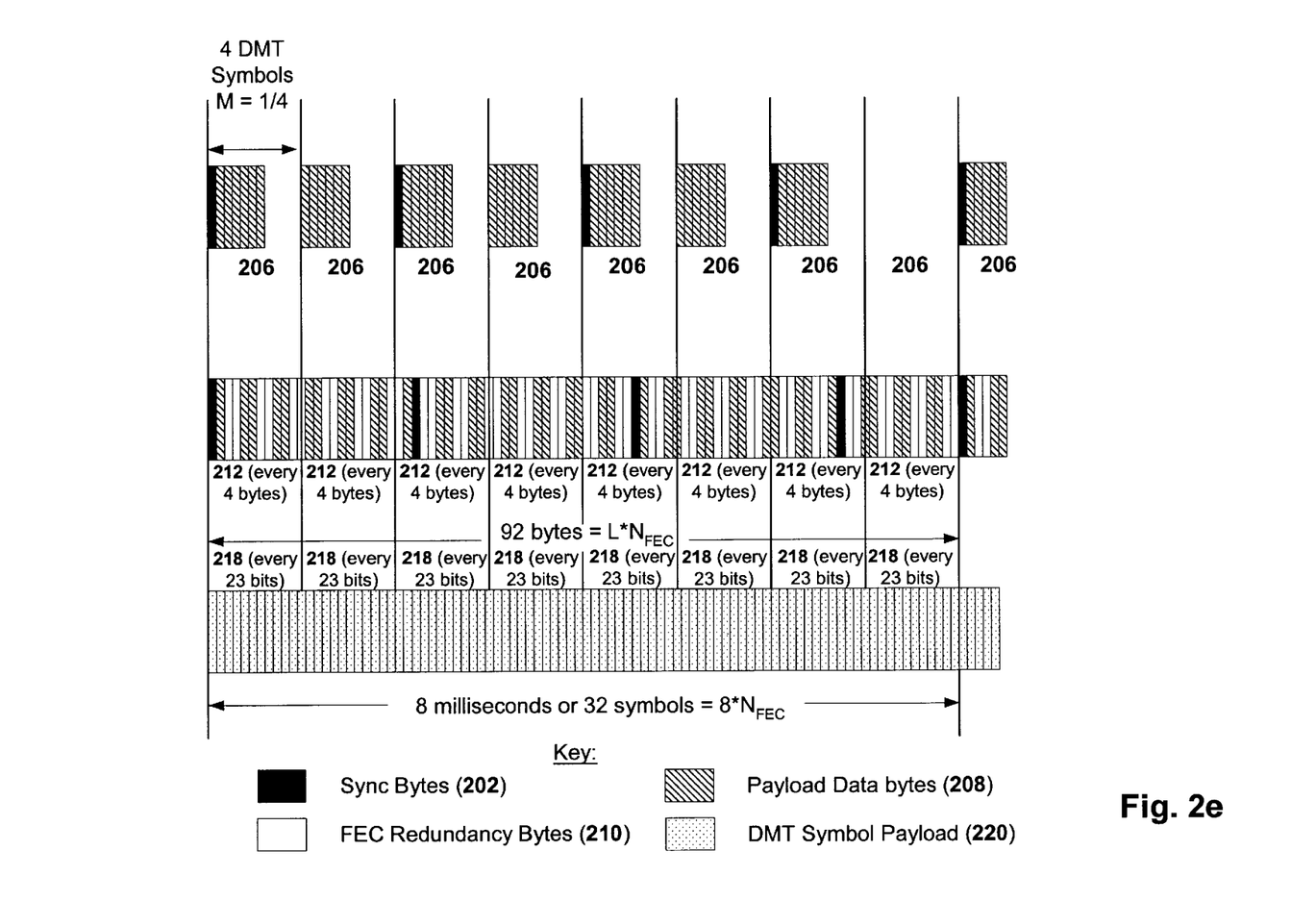

FIG. 2e demonstrates a framing in accordance with one embodiment of the present invention framings. In this particular embodiment, the following parameters are given: $N_{FEC}=4$, R=2, K=2, $N_S=½$, M=¼, L=23, $B_{AV}=5.25$, and D=1. In addition, the line rate is 92. kbps, the net data rate is 42 kbps, the RS codeword overhead is 46 kbps, and the sync byte overhead is 4 kbps. In this example, note there are four DMT symbols per each mux data frame 206, and M is equal to ¼. In addition, $N_S$ is equal to ½ indicating that there is one sync byte per every two mux data frames. There is one sync byte 202 per eight DMT symbols since $N_S=½$ and M=¼. In addition, there are seven consecutive mux data frames 206, each having six payload data bytes 208. Also, every other mux data frame 206 includes a one sync byte 202. The eighth mux data frame 206 is assigned no sync bytes and no payload data bytes. Note that if the sync byte was assigned to the second mux data frame 206 (for each pair of mux data frames assigned a sync byte) instead of the first, the eighth mux data frame 206 would include a sync byte 202 and no payload data bytes 208. The pattern repeats for each set of consecutive eight mux data frames 206. In more detail, the number of payload data bytes carried over $(8*N_{FEC})$ DMT symbols can be calculated by $(L*K)-(N_S*M*8*N_{FEC})$. Given the specified parameters for this example, $B_{8NFEC}$ equals 42. In addition, the number of mux data frames carried over $(8*N_{FEC})$ DMT symbols can be calculated by $M*8*N_{FEC}$, which equals 8 for this example. Thus, 42 payload data bytes are carried by 8 mux data frames. The discussion in reference to FIG. 3 will provide further understanding of this frame example.

Figure 2F:
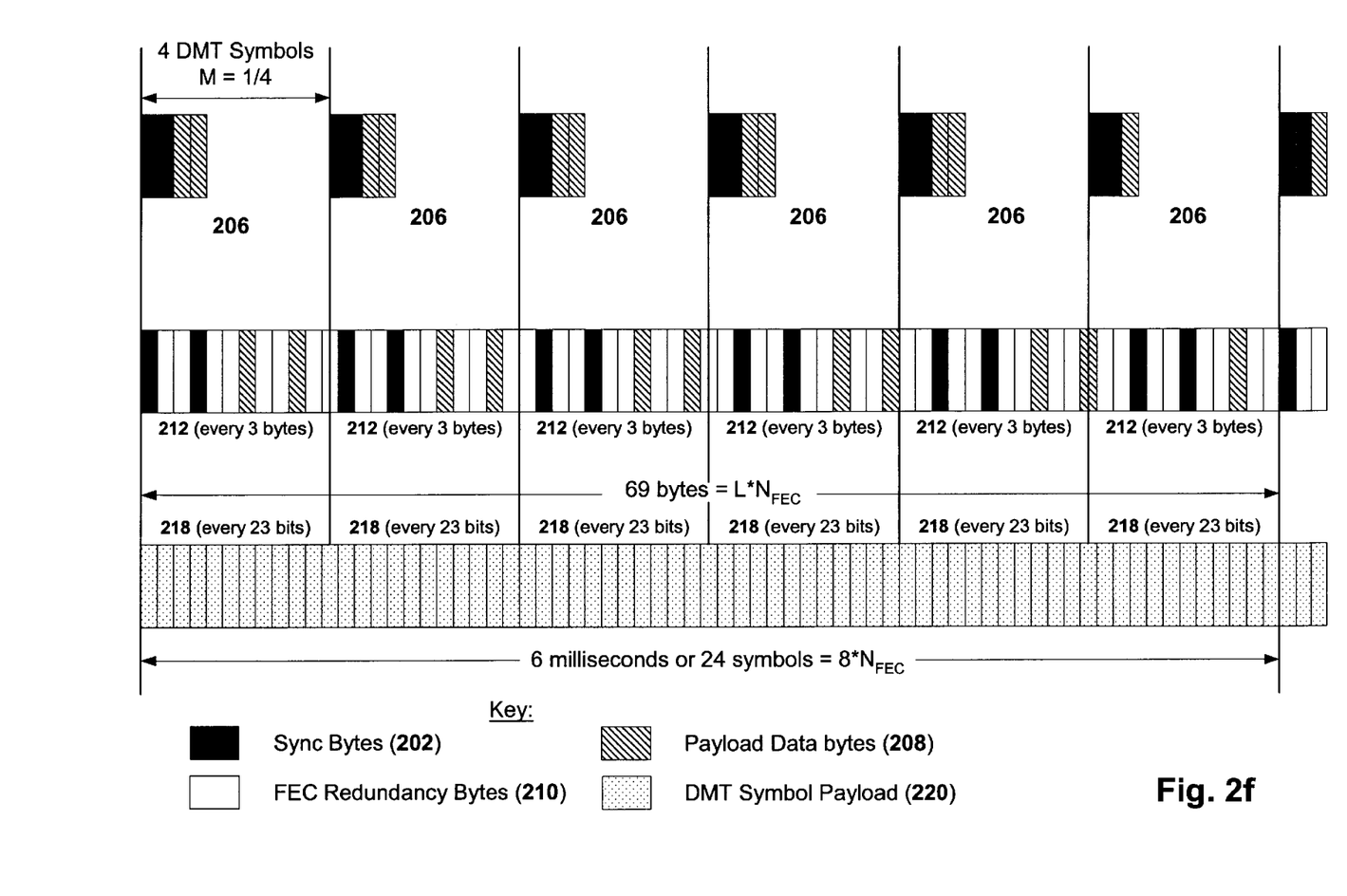

FIG. 2f demonstrates a framing in accordance with one embodiment of the present invention framings. In this particular embodiment, the following parameters are given: $N_{FEC}=3$, R=2, K=1, $N_S=2$, M=¼, L=23, $B_{AV}=1.833$, and D=1. In addition, the line rate is 92 kbps, the net data rate is 14.66 kbps, the RS codeword overhead is 61.33 kbps, and the sync byte overhead is 16 kbps. In this example, there are four DMT symbols per each mux data frame 206, and M is equal to ¼. In addition, $N_S$ is equal to 2 indicating that there are two sync bytes per each mux data frame 206. There are four sync bytes 202 per eight DMT symbols since $N_S=2$ and M=¼. In addition, there are five consecutive mux data frames 206, each having four bytes including two sync bytes 202 and two payload data bytes 208. The sixth mux data frame 206 has three bytes, which in this example, includes two sync bytes 202 and one payload data byte 208. The pattern repeats for each set of consecutive six mux data frames 206. In more detail, the number of payload data bytes carried over $(8*N_{FEC})$ DMT symbols can be calculated by $(L*K)-(N_S*M*8*N_{FEC})$. Given the specified parameters for this example, $B_{8NFEC}$ equals 11. In addition, the number of mux data frames carried over $(8*N_{FEC})$ DMT symbols can be calculated by $M*8*N_{FEC}$, which equals 6 for this example. Thus, 11 payload data bytes are carried by 6 mux data frames. The discussion in reference to FIG. 3 will provide further understanding of this frame example.

Figure 3:
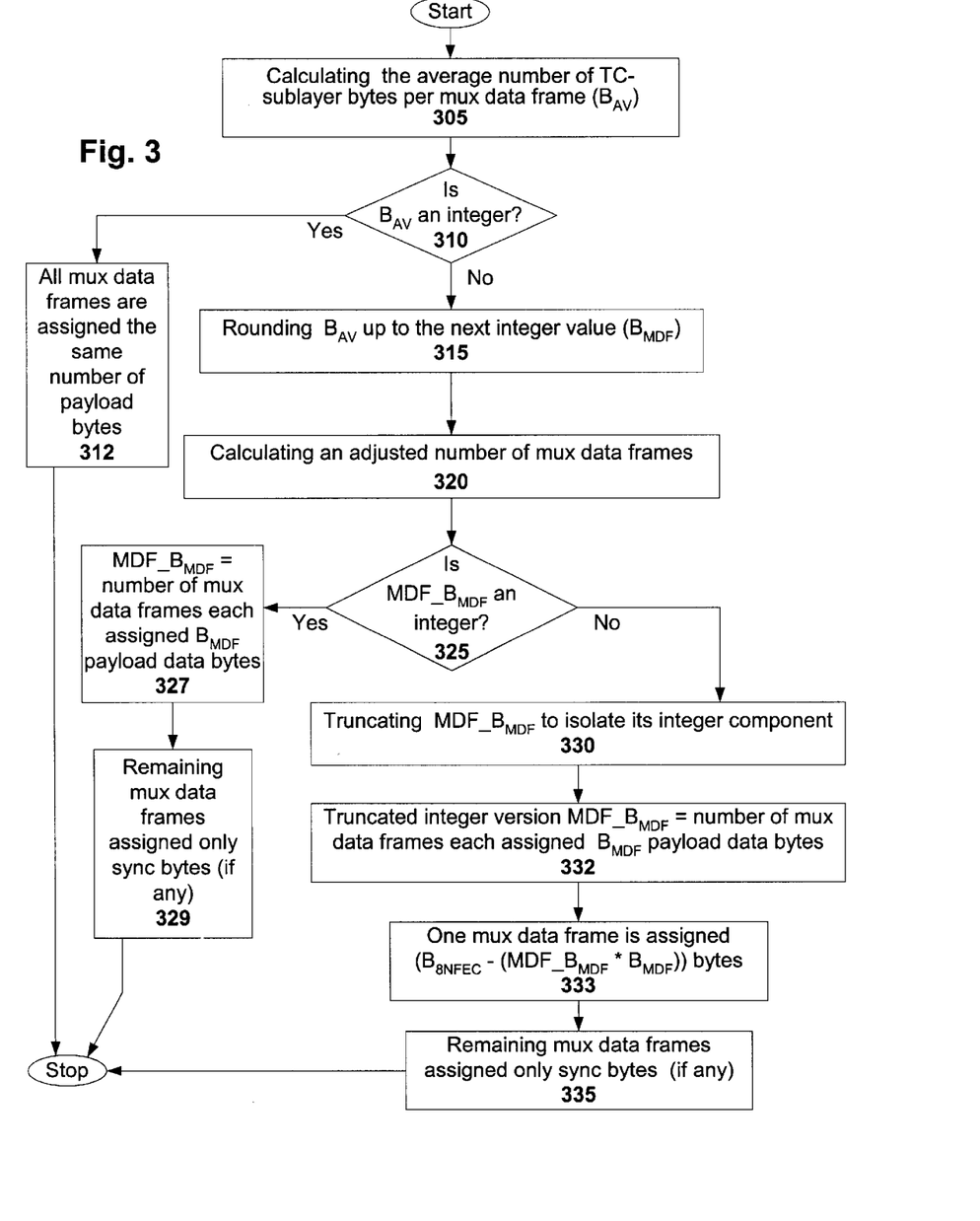
FIG. 3 is a flow chart illustrating a method for assigning bytes to mux data frames in accordance with one embodiment of the present invention.

FIG. 3 is a flow chart illustrating a method for assigning bytes to mux data frames in accordance with one embodiment of the present invention. In general, the resulting mux data frames are effectively byte decoupled from the RS codewords. The mux data frame rate, however, is coupled to the DMT symbol rate through a multiplying factor M. As such, a fixed sync byte overhead that is programmable to different values is guaranteed. This method may be implemented, for example, by the multiplexor module 105 of the transmitter shown in FIG. 1. In the embodiment shown, the overhead sync bytes and payload data bytes are assigned to the mux data frames on the basis of $8*N_{FEC}$ DMT symbols.

Assume the following definitions:

DMT symbol rate DMT symbol rate=4k symbols/sec;

$TB_{8NFEC}=L*N_{FEC}$;

$FEC\_CW_{8NFEC}=L$;

$K_{8NFEC}=L*K$;

$SB_{8NFEC}=N_S*M*8*N_{FEC}$;

$B_{8NFEC}=K_{8NFEC}-SB_{8NFEC}$; and $MDF_{8NFEC}=M*8*N_{FEC}$.

Further assume that $B_{8NFEC}$ bytes need to be carried in $MDF_{8NFEC}$ mux data frames. The method begins with calculating 305 the average number of TC-sublayer bytes per mux data frame, $B_{AV}$. $B_{AV}$ can be calculated by dividing $B_{8NFEC}$ by $MDF_{8NFEC}$, where $B_{8NFEC}$ equals $(L*K)-(N_S*M*8*N_{FEC})$, and $MDF_{8NFEC}$ equals $M*8*N_{FEC}$.

The method proceeds with determining 310 whether $B_{AV}$ is an integer. If $B_{AV}$ is an integer, then all mux data frames are the same size, and assigned the same number of payload data bytes (as indicated by 312), and the method is complete. As such, each mux data frame is assigned the same number of payload data bytes and sync bytes (if any). However, if $B_{AV}$ is a non-integer, then the method includes rounding 315 $B_{AV}$ up to the next integer value. This rounded up integer version of $B_{AV}$ is referred to as $B_{MDF}$ herein.

The method proceeds with calculating 320 an adjusted number of mux data frames. This adjusted number of mux data frames is referred to as $MDF\_B_{MDF}$ herein. $MDF\_B_{MDF}$ can be calculated by dividing $B_{8NFEC}$ by $B_{MDF}$. The method proceeds with determining 325 whether $MDF\_B_{MDF}$ is an integer. If $MDF\_B_{MDF}$ is an integer, then it represents the number of mux data frames that will each be assigned $B_{MDF}$ payload data bytes as indicated by 327. Note that in this case, the remaining mux data frames (as determined by subtracting $MDF\_B_{MDF}$ from $M*8*N_{FEC}$) will be assigned only sync bytes (if any) and no payload data bytes as indicated by 329. Note that there may be no sync bytes assigned to a mux data frame 206 depending on the given parameters (e.g., see FIG. 2d).

On the other hand, if $MDF\_B_{MDF}$ is not an integer, then the method further includes truncating 330 $MDF\_B_{MDF}$ thereby isolating its integer component. This integer component of $MDF\_B_{MDF}$ (referred to as the truncated integer version herein) represents the number of mux data frames that will each be assigned $B_{MDF}$ payload data bytes as indicated by 332. In addition, one mux data frame will be assigned $B_{8NFEC}-(MDF\_B_{MDF}*B_{MDF})$ bytes, where $MDF\_B_{MDF}$ is the truncated integer version as indicated by 333. The remaining mux data frames (as determined by subtracting $(MDF\_B_{MDF}+1)$ from $M*8*N_{FEC}$) will be assigned only sync bytes (if any) and no payload data bytes as indicated by 335. Note that the $MDF\_B_{MDF}$ used to determine the remaining mux data frames is the truncated integer version. Further note that there may be no sync bytes assigned to a mux data frame 206 depending on the given parameters (e.g., see FIG. 2e).

Generally, the method ensures that mux data frame does not accumulate bytes at a rate higher than the PMD (physical media dependent) sublayer can deliver. The net data rate of the link may be calculated by: $M*B_{AV}*32$ kbps.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for assigning bytes to mux data frames in an ADSL DMT system, the method comprising:

calculating an average number of TC-sublayer bytes per mux data frame;

in response to the calculated average number of TC-sublayer bytes per mux data frame being a non-integer, rounding the calculated average number of TC-sublayer bytes per mux data frame up to a next integer value thereby producing an integer version of the average number of TC-sublayer bytes per mux data frame;

calculating an adjusted number of mux data frames based on the integer version of the average number of TC-sublayer bytes per mux data frame; and in response to the adjusted number of mux data frames being a non-integer, truncating the adjusted number of mux data frames thereby producing an integer version of the adjusted number of mux data frames.

2. The method of claim 1, wherein the step of calculating an average number of TC-sublayer bytes per mux data frame includes:

dividing a number of payload data bytes carried over $(8*N_{FEC})$ DMT symbols by a number of mux data frames carried during $(8*N_{FEC})$ DMT symbols.

3. The method of claim 2, wherein the number of payload data bytes carried over $(8*N_{FEC})$ DMT symbols equals $(L*K)-(N_S*M*8*N_{FEC})$, where L equals a number of bits per constellation encoder input data frame, K equals a number of payload data bytes per RS codeword, $N_S$ equals a number of sync bytes per mux data frame, M is a DMT symbol rate multiplying factor that determines mux data frame rate and overhead capacity, and $N_{FEC}$ equals a number of bytes per RS codeword.

4. The method of claim 2, wherein the number of mux data frames carried during $(8*N_{FEC})$ DMT symbols equals $M*8*N_{FEC}$, where M is a DMT symbol rate multiplying factor that couples mux data frame rate to DMT symbol rate, and $N_{FEC}$ equals a number of bytes per RS codeword.

5. The method of claim 1, wherein the step of calculating an adjusted number of mux data frames includes:

dividing a number of payload data bytes carried over $(8*N_{FEC})$ DMT symbols by the integer version of the average number of TC-sublayer bytes per mux data frame.

6. The method of claim 1, wherein in response to the calculated average number of TC-sublayer bytes per mux data frame being an integer, all mux data frames carried during $(8*N_{FEC})$ DMT symbols are assigned a same number of payload data bytes.

7. The method of claim 1, wherein in response to the adjusted number of mux data frames being an integer, the method further includes:

assigning each of a number of mux data frames a number of payload data bytes equal to the integer version of the average number of TC-sublayer bytes per mux data frame, where the number of mux data frames is equal to the adjusted number of mux data frames.

8. The method of claim 1, wherein in response to the adjusted number of mux data frames being an integer, a remaining number of mux data frames is defined by subtracting the adjusted number of mux data frames from a number of mux data frames carried during $(8*N_{FEC})$ DMT symbols.

9. The method of claim 8, wherein each of the remaining number of mux data frames is assigned one or more sync bytes only.

10. The method of claim 8, wherein each of the remaining number of mux data frames is assigned no bytes.

11. The method of claim 1, wherein in response to the adjusted number of mux data frames being a non-integer, the method further includes:
assigning each of a number of mux data frames a number of payload data bytes equal to the integer version of the average number of TC-sublayer bytes per mux data frame, where the number of mux data frames is equal to the integer version of the adjusted number of mux data frames.

12. The method of claim 1, wherein in response to the adjusted number of mux data frames being a non-integer, the method further includes:
assigning one mux data frame $(B_{8NFEC}-(MDF\_B_{MDF}*B_{MDF}))$ bytes, where $B_{8NFEC}$ equals a number of payload data bytes carried over $(8*N_{FEC})$ DMT symbols, $MDF\_B_{MDF}$ is the integer version of the adjusted number of mux data frames, and $B_{MDF}$ is the integer version of the average number of TC-sublayer bytes per mux data frame.

13. The method of claim 1, wherein in response to the adjusted number of mux data frames being a non-integer, a remaining number of mux data frames is defined by subtracting one plus the integer version of the adjusted number of mux data frames from a number of mux data frames carried during $(8*N_{FEC})$ DMT symbols.

14. The method of claim 13, wherein each of the remaining number of mux data frames is assigned one or more sync bytes only.

15. The method of claim 13, wherein each of the remaining number of mux data frames is assigned no bytes.

16. The method of claim 1, wherein the method is carried out by a set of instructions executing on a digital signal processor.

17. A method for assigning bytes to mux data frames in an ADSL DMT system, the method comprising:
calculating an average number of TC-sublayer bytes per mux data frame;
in response to the calculated average number of TC-sublayer bytes per mux data frame being a non-integer, rounding the calculated average number of TC-sublayer bytes per mux data frame up to a next integer value thereby producing an integer version of the average number of TC-sublayer bytes per mux data frame;
calculating an adjusted number of mux data frames based on the integer version of the average number of TC-sublayer bytes per mux data frame; and
in response to the adjusted number of mux data frames being a non-integer, truncating the adjusted number of mux data frames thereby producing an integer version of the adjusted number of mux data frames, the integer version of the adjusted number of mux data frames representing a number of mux data frames each assigned a number of payload data bytes equal to the integer version of the average number of TC-sublayer bytes per mux data frame, and one mux data frame is assigned $(B_{8NFEC}-(MDF\_B_{MDF}*B_{MDF}))$ bytes, where $B_{8NFEC}$ equals a number of payload data bytes carried over $(8*N_{FEC})$ DMT symbols, $MDF\_B_{MDF}$ is the integer version of the adjusted number of mux data frames, and $B_{MDF}$ is the integer version of the average number of TC-sublayer bytes per mux data frame.

18. The method of claim 17, wherein in response to the adjusted number of mux data frames being an integer, the adjusted number of mux data frames represents a number of mux data frames each assigned a number of payload data bytes equal to the integer version of the average number of TC-sublayer bytes per mux data frame, and a remaining number of mux data frames is defined by subtracting the adjusted number of mux data frames from the number of mux data frames carried during $(8*N_{FEC})$ DMT symbols.

19. The method of claim 18, wherein each of the remaining number of mux data frames is assigned one or more sync bytes only.

20. The method of claim 18, wherein each of the remaining number of mux data frames is assigned no bytes.

21. The method of claim 17, wherein in response to the adjusted number of mux data frames being a non-integer, a remaining number of mux data frames is defined by subtracting one plus the integer version of the adjusted number of mux data frames from the number of mux data frames carried during $(8*N_{FEC})$ DMT symbols.

22. The method of claim 21, wherein each of the remaining number of mux data frames is assigned one or more sync bytes only.

23. The method of claim 21, wherein each of the remaining number of mux data frames is assigned no bytes.

24. A method for assigning bytes to mux data frames in an ADSL DMT system, the method comprising:
calculating an average number of TC-sublayer bytes per mux data frame;
in response to the calculated average number of TC-sublayer bytes per mux data frame being a non-integer, rounding the calculated average number of TC-sublayer bytes per mux data frame up to a next integer value thereby producing an integer version of the average number of TC-sublayer bytes per mux data frame;
calculating an adjusted number of mux data frames based on the integer version of the average number of TC-sublayer bytes per mux data frame; and
in response to the adjusted number of mux data frames being an integer:
assigning each of a number of mux data frames a number of payload data bytes equal to the integer version of the average number of TC-sublayer bytes per mux data frame, where the number of mux data frames equals the adjusted number of mux data frames;
in response to the adjusted number of mux data frames being a non-integer:
truncating the adjusted number of mux data frames thereby producing an integer version of the adjusted number of mux data frames;
assigning each of a number of mux data frames a number of payload data bytes equal to the integer version of the average number of TC-sublayer bytes per mux data frame, where the number of mux data frames equals the integer version of the adjusted number of mux data frames; and assigning one mux data frame ($B_{8NFEC}-(MDF\_B_{MDF}*B_{MDF})$) bytes, where $B_{8NFEC}$ equals a number of payload data bytes carried over ($8*N_{FEC}$) DMT symbols, $MDF\_B_{MDF}$ is the integer version of the adjusted number of mux data frames, and $B_{MDF}$ is the integer version of the average number of TC-sublayer bytes per mux data frame.

* * * * *